(12) United States Patent
Townson et al.

(10) Patent No.: US 11,339,702 B2
(45) Date of Patent: May 24, 2022

(54) METHODS AND SYSTEMS FOR AN EXHAUST GAS AFTERTREATMENT SYSTEM

(71) Applicant: Ford Global Technologies, LLC, Dearborn, MI (US)

(72) Inventors: David Townson, London (GB); Jim Bromham, Wiltshire (GB)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/020,956

(22) Filed: Sep. 15, 2020

(65) Prior Publication Data

US 2022/0082045 A1   Mar. 17, 2022

(51) Int. Cl.

| F01N 11/00 | (2006.01) |
|---|---|
| F01N 3/035 | (2006.01) |
| F01N 3/20 | (2006.01) |
| F02D 41/00 | (2006.01) |
| B01D 46/00 | (2022.01) |
| B01D 53/94 | (2006.01) |

(52) U.S. Cl.
CPC ........ *F01N 11/007* (2013.01); *B01D 46/0027* (2013.01); *B01D 53/9431* (2013.01); *B01D 53/9495* (2013.01); *F01N 3/035* (2013.01); *F01N 3/208* (2013.01); *F02D 41/0065* (2013.01); *F01N 2550/04* (2013.01); *F01N 2610/02* (2013.01); *F01N 2610/146* (2013.01); *F01N 2900/08* (2013.01); *F01N 2900/1402* (2013.01); *F01N 2900/1606* (2013.01)

(58) Field of Classification Search
CPC combination set(s) only.
See application file for complete search history.

(56) References Cited

U.S. PATENT DOCUMENTS

| 9,273,576 | B2 * | 3/2016 | Chen | F02D 41/027 |
|---|---|---|---|---|
| 9,371,767 | B2 * | 6/2016 | DeGeorge | F01N 3/103 |
| 9,382,830 | B2 * | 7/2016 | Shibata | F01N 3/106 |
| 9,759,117 | B2 * | 9/2017 | Matsumoto | F01N 3/208 |
| 10,508,582 | B2 * | 12/2019 | Hall | G01M 15/102 |
| 2011/0131950 | A1 | 6/2011 | Parnin | |
| 2016/0376972 | A1 * | 12/2016 | Hagimoto | F01N 3/2066 60/276 |
| 2017/0152784 | A1 * | 6/2017 | Kidokoro | G01N 15/0826 |

* cited by examiner

*Primary Examiner* — Bing Q Tran
(74) *Attorney, Agent, or Firm* — Haley Guiliano LLP

(57) ABSTRACT

Systems and methods are described for performing a diagnostic on an exhaust gas aftertreatment system. A gas entry parameter into a portion of an exhaust system of an engine is determined. In response to determining that the gas entry parameter is less than the predetermined threshold, a level of NH3 in the exhaust gas is determined. In response to determining that the level of NH3 is above a threshold value, degradation of a particulate filter of the exhaust gas aftertreatment system is indicated.

17 Claims, 3 Drawing Sheets

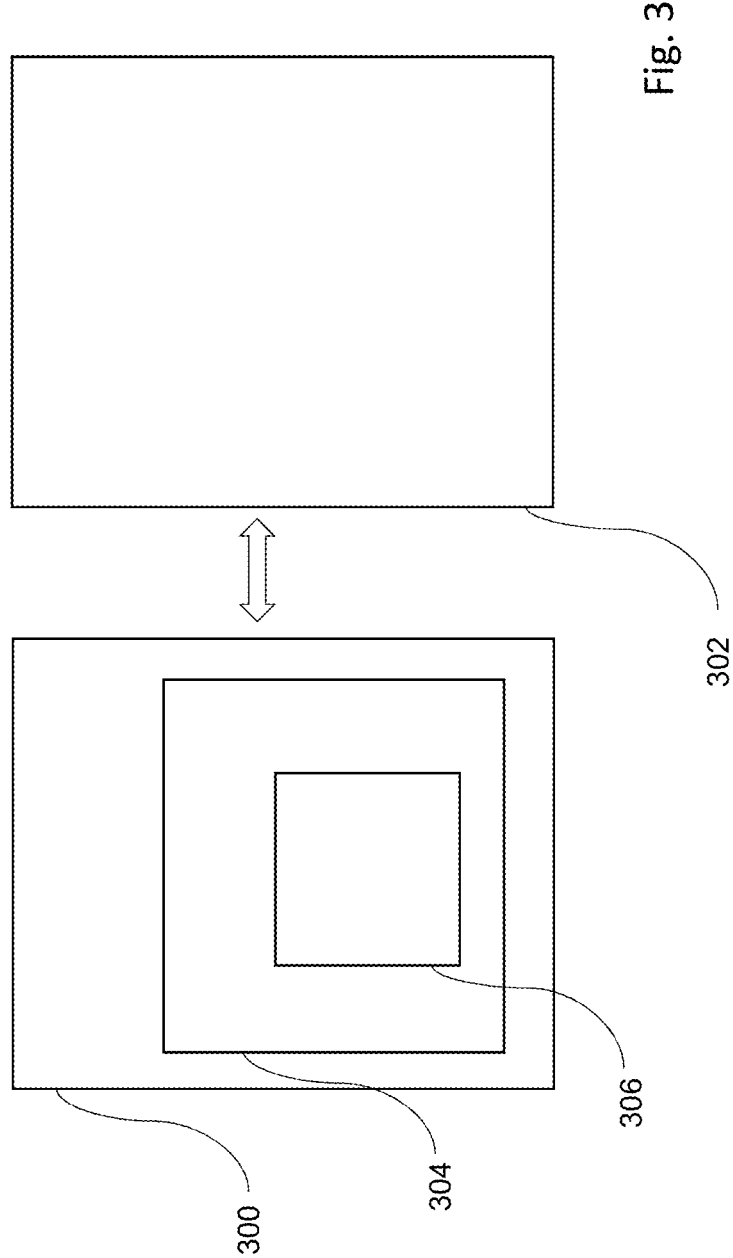

METHODS AND SYSTEMS FOR AN EXHAUST GAS AFTERTREATMENT SYSTEM

BACKGROUND

The present disclosure relates to diagnostic methods and systems for an exhaust gas aftertreatment system, and in particular, but not exclusively, to determining degradation of an aftertreatment system using a NOx sensor during engine overrun conditions.

SUMMARY

In order for a vehicle to meet emission regulations, it is common for the exhaust gases produced by the engine of the vehicle to pass through a cleaning process before they are released to the environment. The cleaning process can be carried out by an exhaust gas aftertreatment system, which may comprise one or more components, such as a diesel particulate filter (DPF), a diesel oxidation catalyst (DOC) and a selective catalyst reduction (SCR) module, and/or an ammonia slip catalyst (ASC). However, the efficiency of these components may degrade overtime, for example as they become clogged by particulate matter, such as soot. In some cases, the efficiency of an aftertreatment component may be measured using a dedicated sensor positioned downstream of the component. For example, the efficiency of a DPF may be measured using a dedicated soot sensor positioned downstream of the DPF. However, it is desirable to remove the need for such a dedicated sensor.

Systems and methods are provided herein for monitoring the operational condition of a component of an exhaust aftertreatment system.

According to a first aspect of the present disclosure, there is provided a method, e.g., a diagnostic method, for an exhaust gas aftertreatment system. For example, the method may be used to determine the operational efficiency of one or more components of the exhaust gas aftertreatment system. The method comprises a step of determining a gas entry parameter into a portion of an exhaust system of an engine, e.g., into a portion of the exhaust upstream of the exhaust gas aftertreatment system. The method comprises a step of, in response to determining that the gas entry parameter is less than the predetermined gas entry parameter threshold, determining a level of NH3 in the exhaust gas. The method comprises, in response to determining that the level of NH3 is above a threshold NH3 value, indicating degradation of a particulate filter of the exhaust gas aftertreatment system.

In some examples, the gas entry parameter may be based on the composition of the gas in the exhaust system, e.g., as the gas enters the exhaust system. For example, the gas entry parameter may be based on the amount of and/or proportion of NOx, or any other appropriate type of gas, in the exhaust gas. Additionally or alternatively, the gas entry parameter may be based on an operational state of an engine to which the exhaust gas aftertreatment system is coupled. For example, the gas entry parameter may be based on the output torque of the engine. In some operational conditions, the output torque of the engine may determine the amount of and/or proportion of NOx in the exhaust gas. Additionally or alternatively, the gas entry parameter may be based on an operational state of a vehicle to which the exhaust gas aftertreatment system is fitted. For example, the gas entry parameter may be based on one or more signals received from a control module of the vehicle.

In some examples, the gas entry parameter is compared to a predetermined threshold for the gas entry parameter. The predetermined threshold for the gas entry parameter may be stored in memory, e.g., in memory of a control module of the vehicle. The predetermined threshold for the gas entry parameter may be stored in a look up table. The predetermined threshold for the gas entry parameter may vary depending on the operational condition and/or environment of the aftertreatment system and/or the vehicle to which the aftertreatment system is fitted. For example, the predetermined threshold for the gas entry parameter may depend on the condition of the aftertreatment system and/or the condition of the vehicle to which the aftertreatment system is fitted.

In some examples, in response to determining that the gas entry parameter is less than a predetermined threshold, ammonia (NH3), e.g., in the form of an aqueous urea solution, is injected into the exhaust system. The NH3 may be injected at a position upstream of the particulate filter in the exhaust gas aftertreatment system. For example, the NH3 may be injected using an SCR injector of a first SCR can of the aftertreatment system.

In some examples, in response to determining that the gas entry parameter is less than a predetermined threshold, exhaust gas is recirculated through the exhaust system. For example, a control module may cause a gas flow valve to divert the exhaust gas into the exhaust gas recirculation system, e.g., in response to the injection of urea into the system. The injection of the urea and the recirculation of the gas may be caused to happen approximately at the same time.

In some examples, in response to determining that the level of NH3 is above a threshold NH3 value, an engine operating mode may be initiated, changed or adjusted. For example, where the level of NH3 is above the threshold NH3 value, a control module may cause the engine to operate in a mode where less particulate matter is produced.

The predetermined NH3 threshold value may be stored in memory, e.g., in memory of a control module of the vehicle. The predetermined NH3 threshold value may be stored in a look up table. The predetermined NH3 threshold value may vary depending on the operational condition and/or environment of the aftertreatment system and/or the vehicle to which the aftertreatment system is fitted. For example, the predetermined NH3 threshold value may depend on the condition of the aftertreatment system and/or the condition of the vehicle to which the aftertreatment system is fitted.

In some examples, the gas entry parameter may be monitored for a predetermined period. In some examples, the NH3 may be injected when, e.g., only when, the gas entry parameter is less than the predetermined threshold for more than the predetermined period. In some examples, the exhaust gas is caused to recirculate when, e.g., only when, the gas entry parameter is less than the predetermined threshold for more than the predetermined period.

In some examples, the determined level of NH3 may be integrated over several cycles. For example, the method may comprise running a diagnostic cycle comprising one or more of the above steps k number of times, where k is a number chosen depending on the operational conditions of the aftertreatment system. For example, where the aftertreatment system is relatively new, the number of cycles over which the determined level of NH3 is integrated may be small, e.g., 3 cycles. However, where the aftertreatment system is relatively old, the number of cycles over which the determined level of NH3 is integrated may be larger, e.g., 10 cycles.

According to a second aspect of the present disclosure, there is provided a computer program comprising instructions to cause a control module of an engine and/or a control module of a vehicle to carry out at least one of the above method steps.

According to a third aspect of the present disclosure, there is provided a non-transitory computer-readable medium storing, or a data carrier signal carrying, the above computer program.

According to a fourth aspect of the present disclosure, there is provided a control module configured to carry out at least one of the above method steps.

According to a fifth aspect of the present disclosure, there is provided a diagnostic system comprising an exhaust gas aftertreatment system having a particulate filter and at least one sensor, such as a NOx sensor, and a control module. The control module is configured to determine a gas entry parameter into a portion of an exhaust system of an engine. The control module is configured to, in response to determining that the gas entry parameter is less than a predetermined threshold, determine a level of NH3 in the exhaust gas using the sensor. The control module is configured to, in response to determining that the level of NH3 is above a threshold value, indicate degradation of the particulate filter of the exhaust gas aftertreatment system.

In some examples, the system comprises an exhaust gas recirculation system and an injector. The control module may be configured to, in response to determining that the gas entry parameter is less than a predetermined threshold, inject NH3 into the exhaust gas aftertreatment system. The control module may be configured to, in response to determining that the gas entry parameter is less than the predetermined threshold, cause the exhaust gas to be recirculated through the exhaust gas recirculation system.

In some examples, the level of NH3 in the exhaust gas is determined using a NOx sensor. In some examples, the gas entry parameter depends on a reading from the NOx sensor. The NOx sensor may be provided at a position upstream of the particulate filter in the exhaust gas aftertreatment system. The NOx sensor may be a feed gas NOx sensor of a first SCR can of the aftertreatment system. A second NOx sensor may be provided downstream of the particulate filter, e.g., at a position in-between the particulate filter and the flow control valve of the exhaust gas recirculation system In some examples, the exhaust gas is recirculated using a low pressure exhaust gas recirculation system. The inlet to the low pressure exhaust gas recirculation system may be downstream of the particulate filter of the exhaust gas aftertreatment system.

According to a sixth aspect of the present disclosure, there is provided a vehicle comprising at least one of the above diagnostic system and the above control module.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 3 illustrates an example machine-readable medium in communication with a processor, in accordance with some embodiments of the disclosure.

DETAILED DESCRIPTION

Figure 1:
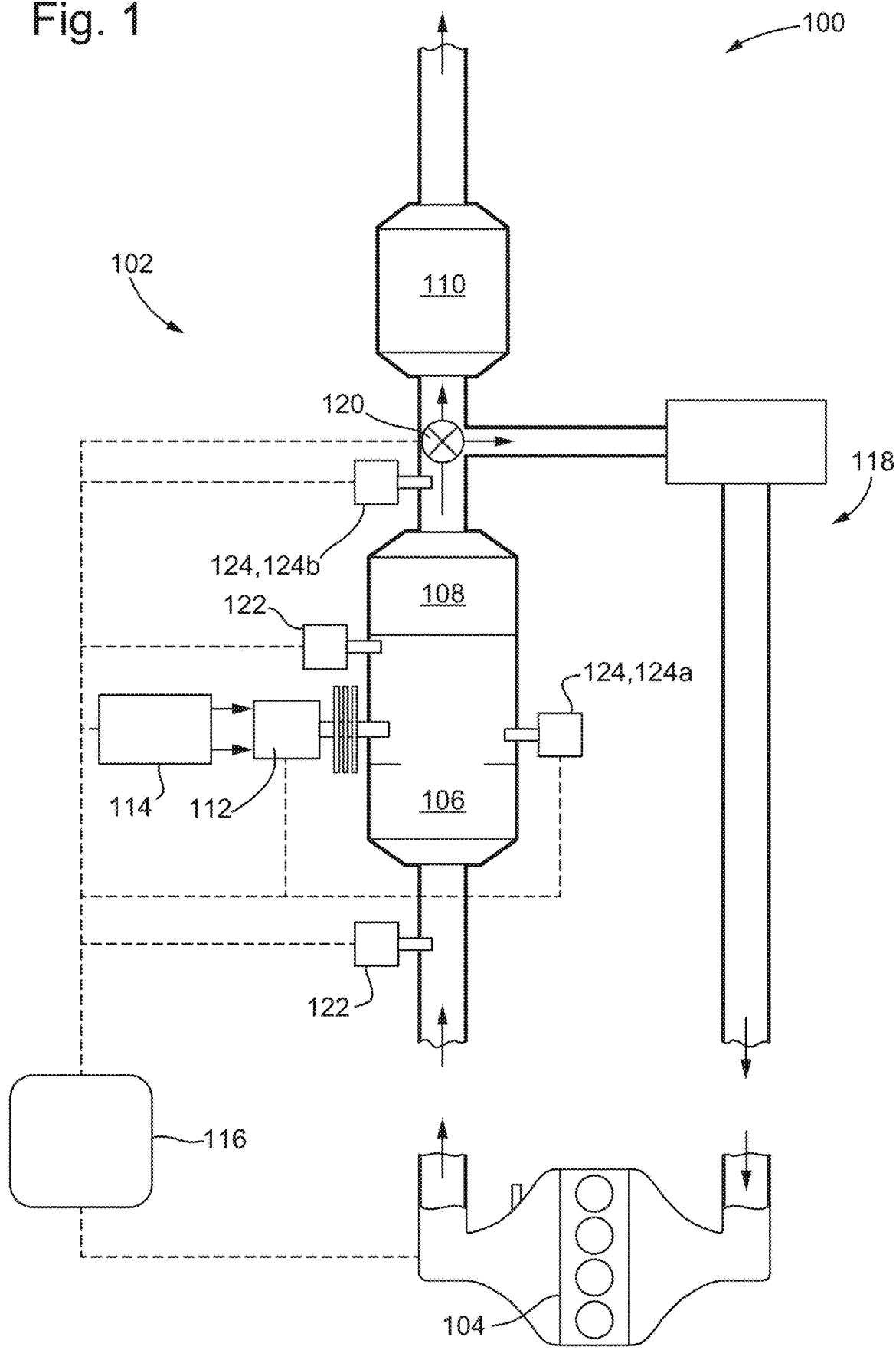
FIG. 1 illustrates a schematic diagram of a diagnostic system for an Exhaust gas aftertreatment system, in accordance with some embodiments of the disclosure.
Figure 2:
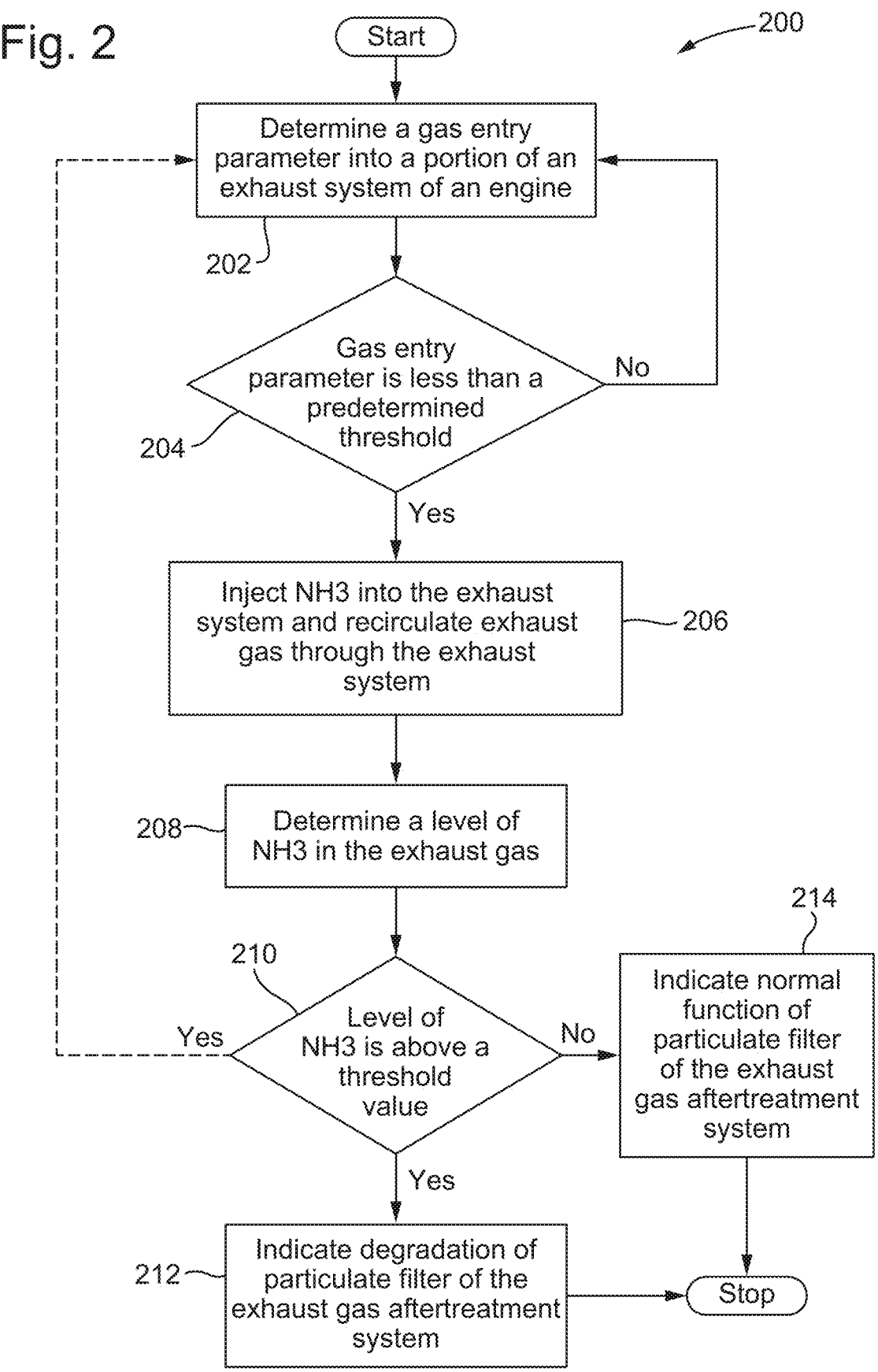
FIG. 2 is a flowchart representing a diagnostic method for an exhaust gas aftertreatment system, in accordance with some embodiments of the disclosure.

FIG. 1 illustrates a system 100 configured to perform diagnostics for an exhaust gas aftertreatment system, and FIG. 2 is a flowchart representing an illustrative diagnostic process 200 for the exhaust gas aftertreatment system shown FIG. 1. Whilst the below description refers to the use of system 100, as shown in FIG. 1, in process 200, shown in FIG. 2, it will be appreciated that the process 200 may be implemented on system 100 and/or any other appropriately configured system architecture.

System 100 illustrates an exhaust gas aftertreatment system 102 (hereinafter referred to as the aftertreatment system) for use with an engine, such as diesel engine 104. The aftertreatment system 102 comprises a diesel oxidation catalyst (DOC) 106, a diesel particulate filter (DPF) 108 and a selective catalyst reduction (SCR) module 110, which are arranged in series. However, in other examples, not shown here, the aftertreatment system 102 may comprise, in addition or alternatively, one or more other appropriate aftertreatment components provided at any appropriate location in the aftertreatment system 102.

The aftertreatment system 102 comprises an SCR injector 112 provided in between the DOC 106 and the DPF 108, such that the SCR injector 112 is configured to deliver one or more reagents, such as an aqueous urea solution, into the aftertreatment system 102 at a location downstream of the DOC 106 and upstream of the DPF 108 and the SCR module 110. However, in an alternative example (not shown), the SCR injector 112 (and/or one or more other similar injectors) may be provided at any appropriate location in the aftertreatment system 102. The SCR injector 112 is operatively connected to a dosing control module 114 configured to control the delivery of reagents through the SCR injector 112, for example during lean burn engine operating conditions. In the example shown in FIG. 1, the dosing control module 114 is operatively connected to controller 116, which is configured to determine one or more operational parameters of the engine 104, such that the dosing control module 114 and the SCR injector 112 deliver reagents into the aftertreatment system 102 as required depending on engine operating conditions, e.g., to enable a reduction in the levels of NOx in the exhaust gases.

Controller 116 may include control circuitry, comprising storage and/or processing circuitry, and input/output (hereinafter "I/O") paths configured to communicate with one or more other controllers, such as dosing control module 114. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor. In some embodiments, processing circuitry may be distributed across multiple separate processors, for example, multiple of the same type of processors or multiple different processors.

In some embodiments, control circuitry and/or processing circuitry may be configured to execute instructions for an application stored in memory (e.g., in the storage of controller 116). Specifically, control circuitry may be instructed by the application to perform the functions discussed herein. In some implementations, any action performed by control circuitry may be based on instructions received from the application. For example, the application may be implemented as software or a set of executable instructions that may be stored in memory and executed by control circuitry, e.g., in response to one or more operational parameter of an vehicle component, such as aftertreatment system 102 and/or engine 104.

The application may be implemented using any suitable architecture. For example, it may be a stand-alone application wholly implemented on controller 116. In such an approach, instructions for the application may be stored locally, and data, e.g., one or more predetermined thresholds for at least one parameter, for use by the application may be downloaded (e.g., from an out-of-band feed, from an Internet resource, or using another suitable approach). Control circuitry may retrieve instructions for the application from storage and process the instructions to perform the functionality described herein. Based on the processed instructions, control circuitry may determine what action to perform when input is received from one or more sensors, e.g., an engine sensor or an aftertreatment system sensor.

In some examples, the aftertreatment system 102 may be operationally coupled to an exhaust gas recirculation (EGR) system. In the example shown in FIG. 1, the EGR system 118 is a low pressure (LP) EGR system 118. However, in other examples, the aftertreatment system 102 may be operationally coupled to a high pressure (HP) EGR system 118 in addition to or instead of the LP EGR system 118. The LP EGR system 118 comprises a flow control valve 120 provided, for example, between the DPF 108 and the SCR module 110. The flow control valve 120 is operatively connected to at least one of the dosing control module 114 and the controller 116. In this manner, operation of the flow control valve 120, and thus the flow of exhaust gases through the LP EGR system 118, may be controlled based on one or more operational parameters of the engine 104 and/or the operation of the SCR injector 112.

In the example shown in FIG. 1, the aftertreatment system 102 comprises a plurality of sensors, such as temperature sensors 122 and/or NOx sensors 124. In the example shown in FIG. 1, the aftertreatment system 102 comprises a first NOx sensor 124a (feed gas NOx sensor), and a second NOx sensor 124b (mid-bed NOx sensor). However, in other examples (not shown), the aftertreatment system 102 may comprise any other appropriate type of sensor that may be used in combination with, or instead of, the sensors shown in FIG. 1. Whilst not shown in FIG. 1, each of the sensors of the aftertreatment system 102 may be operatively connected to one or more controllers, such as dosing control module 114 and/or controller 116. In this manner, although not used in the process disclosed herein, the signals output from the sensors may be used as inputs to one or more processes for controlling the operation of the aftertreatment system 102. In particular, the output from the sensors may be used as inputs to controller 116 when performing a diagnostic method on the aftertreatment system 106, such as process 200 shown in FIG. 2.

In conventional systems, degradation of a DPF is usually determined based on the reading of a particulate matter sensor placed downstream of the DPF. For example, in situations where the DPF is damaged, such as by virtue of physical breaks or cracks in the DPF, the level of particulate matter in the exhaust gases downstream of the DPF will be greater than normal as a result of the damage to the DPF. In such conventional systems, the particulate matter sensor detects increased levels of particulate matter when the DPF is damaged.

The present disclosure is beneficial as it removes the need for a particulate matter sensor used for detecting degradation of a DPF, which reduces cost and complexity of an aftertreatment system. For example, system 100 may utilise one or more existing NOx sensors 124 to help determine degradation of the DPF 108.

With reference to FIG. 2, process 200 illustrates an example method for determining degradation of the DPF 108 based on levels of ammonia in the exhaust gases.

At step 202, an exhaust gas entry parameter is determined. The exhaust gas entry parameter is used as an indication of the composition of the exhaust gases, e.g., as the exhaust gases enter the aftertreatment system 102. In some examples, the gas entry condition (e.g., parameter) is based on, e.g., based only on, an operational state of the engine 104. For example, controller 116 may be configured to determine when the engine 104 is operating in overrun conditions, e.g., zero torque output. In such a condition, the level of NOx in the exhaust gas will fall to approximately 0 ppm, since no combustion is taking place in the engine 104. Additionally or alternatively, the gas entry parameter may be based on, e.g., based only on, a reading from one or more sensors of the aftertreatment system. For example, the exhaust gas parameter may be based on a reading from a NOx sensor, so that NOx levels in the exhaust gas can be determined directly, e.g., irrespective of engine operating conditions. In some examples, one or more other sensors of the aftertreatment system 100, such as temperature sensor 122 may be used, either alone or in combination with NOx sensor 124, to determine the gas entry parameter.

In some examples, the determined gas entry parameter is compared to a predetermined threshold for the gas entry parameter. For example, where the gas entry parameter is based on an operational state of the engine 104, the predetermined threshold may be a value of torque output of the engine, e.g., approximately equal to 0 Nm or less than or equal to a very low level of torque, such as 5 Nm. Where the gas entry parameter is based on a reading from one or more sensors of the aftertreatment system 102, the predetermined threshold may be a value of a gas concentration in the exhaust gases in the aftertreatment system 102, e.g., approximately equal to 0 ppm of NOx or less than or equal to a very low concentration of NOx, such as 20 ppm.

In some examples, process 200 may comprise determining that the gas entry parameter is stable over a predetermined period, e.g., 5s or 10s. For example, process 200 may comprise determining that the gas entry parameter remains below the predetermined threshold for the gas entry parameter for a certain amount of time, e.g., 5s or 10s, or during periods of engine overrun. In this manner, process 200 ensures that any exhaust gases have been flushed through the aftertreatment system. For example, process 200 may comprise determining that the concentration of NOx in the exhaust gases remains below a threshold value, e.g., 5 ppm, for a period of 10 s. In some examples, the period for which the gas entry parameter is monitored and/or the threshold value(s) for the gas entry parameter may be selected (and tuned) based on one or more physical parameters of the aftertreatment system, such as the flow rate of gas through the aftertreatment system 102.

At step 204, where it is determined that the gas entry parameter is above the predetermined threshold for the gas entry parameter, process 200 returns to step 202. Where it is determined that the gas entry parameter is less than (or less than or equal to) the predetermined threshold, process 200 moves on to step 206, at which point the reading from NOx sensor 124 will show negligible amounts of NOx in the exhaust gases.

At step 206, in response to determining that the gas entry parameter is less than the predetermined threshold, control module 114 controls SCR injector 112 to deliver a dose of urea into the aftertreatment system 102. Since NOx sensor 124 measures NOx and NH3 (and/or urea) indistinctly, a signal will be generated by the NOx sensor in response to detecting NH3 even in the absence to NOx in the exhaust gases.

At step 206, in response to determining that the gas entry parameter is less than the predetermined threshold, control module 116 controls flow control valve 120 to direct flow through the LPEGR system 118. In this manner, when urea is delivered into the aftertreatment system 102 at step 206, it is recirculated through the engine 104 and back into the exhaust system when there is degradation to the DFP 108. For example, where the DPF 108 is cracked, the urea injected at step 206 is able to pass through the DPF 108 and into the LP EGR loop 118. In contrast, where the DPF 108 is not damaged, injected urea is not able to pass through the DPF 108. Since the levels of NOx in the aftertreatment system 102 have been determined to be negligible, any reading by NOx sensor 124 will be indicative of the presence of urea in the system at the location of the NOx sensor 124.

At step 208, the level of NH3 in the aftertreatment system 102 is determined using NOx sensor 124. In the example shown in FIG. 1, the level of NH3 in the aftertreatment system 102 is determined using a feed gas NOx sensor 124a, which is located immediately upstream of the DFP 108. As such, feed gas NOx sensor 124a is able to give a direct indication of the level of NH3 in the recirculated exhaust gas (since no NOx is present) and thus an indication of the level of degradation of the DPF 108.

In another example, the level of NH3 in the aftertreatment system 102 may be determined (additionally or alternatively) using a NOx sensor located downstream of the DPF 108, such as a mid-bed DPF 124b. However, it is understood that such a downstream NOx sensor may not be necessary as a result of implementing a control strategy whereby exhaust gases are recirculated through the LP EGR in response to determining that the gas entry parameter is less than the predetermined threshold.

At step 210, the level of NH3 is compared to a predetermined NH3 threshold. For example, in some circumstances, it may be normal (or acceptable) for a small amount of urea to pass though the DPF 108. As such, the predetermined NH3 threshold may be set according to the operational conditions or environment of the aftertreatment system 102. For example, the predetermined NH3 threshold may be set according to the rules of a zonal emission zone in a city. In this manner, stricter control over the performance of the DPF 108 may be implemented, as necessary. For example, where a vehicle is to operate within a low emission zone of a city, the predetermined NH3 threshold may be set to a very low level to ensure that even the slightest degradation of the DPF 108 is detected.

At step 212, in response to determining that the level of NH3 is above (or at least equal to) the predetermined NH3 threshold, degradation of the function of the DPF 108 is indicated, e.g., via a HMI to the driver of the vehicle to which the aftertreatment system 102 is fitted.

Alternatively, process 200 may, in response to determining that the level of NH3 is above (or at least equal to) the predetermined NH3 threshold, return to step 202 (see dotted line) and repeat steps 202 to 210 for a predetermined number of times, e.g., 10 times. Each repeat need not necessarily be during the same period of engine overrun. For example, steps 202 to 210 may be carried out for a first time during a first operational cycle of the engine 104, and steps 202 to 210 may be repeated for a second time during another operational cycle of the engine 104. In this manner, the level of measured NH3 that is recirculated through the engine 104 may be integrated over multiple overrun events to increase the accuracy of the process.

In some examples, not shown, process 200 may comprise a step of adjusting or modifying one or more operational parameters of the engine, e.g., in response to determining that the level of NH3 is above (or at least equal to) the predetermined NH3 threshold. For example, where process 200 determines degradation of the DPF 108, one or more engine operating modes may be implemented to limit or restrict the engine 104 from producing particulate matter.

At step 214, in response to determining that the level of NH3 is below the predetermined NH3 threshold, normal function of the DPF 108 is indicated, and process 200 terminates.

The above system 100 and process 200 are beneficial as they reduce the complexity and cost of conventional systems and processes for diagnosing degradation of a DPF, for example by removing the need for an additional sensor, such as a particulate matter sensor or another NOx sensor.

FIG. 3 shows an example non-transitory machine-readable storage medium 300 and a processor 302. For example, dosing control module 114 and/or controller 116 may each comprise at least one of non-transitory machine-readable storage medium 300 and a processor 302. The medium 300 is encoded with instructions 304 that are executable by the processor 302. When executed by the processor, the instructions cause the processor to perform process 200, e.g., using system 100, as described above with reference to FIGS. 1 and 2. For example, the instructions 304 comprise instructions 306 to cause SCR injector 112 to deliver a dose of urea into aftertreatment system 102 and/or flow control valve 120 to divert exhaust gas (containing the delivered urea) into the EGR system 118, e.g., in response to determining that the gas entry parameter is less than a predetermined gas entry parameter threshold.

The processes and systems described above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one example may be applied to any other example herein, and flowcharts or examples relating to one example may be combined with any other example in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A diagnostic method for an exhaust gas aftertreatment system, the method comprising:
   determining a gas entry parameter into a portion of an exhaust system of an engine;

in response to determining that the gas entry parameter is less than a predetermined gas entry parameter threshold, determining a level of NH3 in the exhaust gas; and in response to determining that the level of NH3 is above a threshold NH3 value, indicating degradation of a particulate filter of the exhaust gas aftertreatment system.

2. The method according to claim 1, wherein the level of NH3 in the exhaust gas is determined using a NOx sensor.

3. The method according to claim 2, wherein the NOx sensor is provided at a position upstream of the particulate filter in the exhaust gas aftertreatment system.

4. The method according to claim 1, wherein, in response to determining that the gas entry parameter is less than a predetermined threshold, injecting NH3 into the exhaust system.

5. The method according to claim 4, wherein NH3 is injected at a position upstream of the particulate filter in the exhaust gas aftertreatment system.

6. The method according to claim 1, wherein, in response to determining that the gas entry parameter is less than a predetermined threshold, recirculating exhaust gas through the exhaust system.

7. The method according to claim 6, wherein the exhaust gas is recirculated using a low pressure exhaust gas recirculation system.

8. The method according to claim 7, wherein the inlet to the low pressure exhaust gas recirculation system is downstream of the particulate filter of the exhaust gas aftertreatment system.

9. The method according to claim 1, wherein the gas entry parameter is based on the operational state of an engine to which the exhaust gas aftertreatment system is coupled.

10. The method according to claim 1, wherein the gas entry parameter is based on the composition of the exhaust gases in the exhaust system.

11. The method according to claim 1, wherein, in response to determining that the level of NH3 is above a threshold value, initiating an engine operating mode.

12. The method according to claim 1, the method comprising determining that the gas entry parameter is less than the predetermined threshold for a predetermined period.

13. The method according to claim 1, the method comprising integrating the determined level of NH3 over multiple cycles.

14. A non-transitory computer readable medium having instructions encoded thereon that when executed by control circuitry cause the control circuitry to:

determine a gas entry parameter into a portion of an exhaust system of an engine;

in response to determining that the gas entry parameter is less than a predetermined gas entry parameter threshold, determine a level of NH3 in the exhaust gas; and in response to determining that the level of NH3 is above a threshold NH3 value, indicate degradation of a particulate filter of the exhaust gas aftertreatment system.

15. A diagnostic system comprising:

an exhaust gas aftertreatment system having a particulate filter and a sensor; and a control module, wherein the control module is configured to:

determine a gas entry parameter into a portion of an exhaust system of an engine;

in response to determining that the gas entry parameter is less than a predetermined gas entry parameter threshold, determine a level of NH3 in the exhaust gas using the sensor; and in response to determining that the level of NH3 is above an NH3 threshold value, indicate degradation of the particulate filter of the exhaust gas aftertreatment system.

16. The diagnostic system according to claim 15, the system comprising an exhaust gas recirculation system and an injector, wherein the control module is configured to:

in response to determining that the gas entry parameter is less than a predetermined threshold, inject NH3 into the exhaust gas aftertreatment system; and cause the exhaust gas to be recirculated through the exhaust gas recirculation system.

17. A vehicle comprising the diagnostic system according to claim 15.

* * * * *